(12) United States Patent
Scanlon et al.

(10) Patent No.: US 10,492,039 B1
(45) Date of Patent: Nov. 26, 2019

(54) STATE-BASED ELECTRONIC MESSAGE MANAGEMENT SYSTEMS AND CONTROLLERS

(71) Applicant: The Travelers Indemnity Company, Hartford, CT (US)

(72) Inventors: Ryan M. Scanlon, East Hampton, CT (US); Douglas L. Roy, Plantsville, CT (US); Flinn Mueller, Simsbury, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 16/271,405

(22) Filed: Feb. 8, 2019

Related U.S. Application Data

(63) Continuation of application No. 16/024,152, filed on Jun. 29, 2018, now Pat. No. 10,219,122.

(51) Int. Cl.
| | |
|---|---|
| *H04W 4/14* | (2009.01) |
| *H04L 12/58* | (2006.01) |
| *H04W 4/90* | (2018.01) |
| *H04W 4/02* | (2018.01) |

(52) U.S. Cl.
CPC ............ *H04W 4/14* (2013.01); *H04L 51/046* (2013.01); *H04L 51/10* (2013.01); *H04L 51/20* (2013.01); *H04L 51/38* (2013.01); *H04W 4/025* (2013.01); *H04W 4/90* (2018.02)

(58) Field of Classification Search
CPC ................................ H04W 4/14; H04L 67/22
USPC ......................................................... 455/466
See application file for complete search history.

(56) References Cited

U.S. PATENT DOCUMENTS

| 9,333,913 | B1* | 5/2016 | Elders ..................... B60Q 9/008 |
|---|---|---|---|
| 9,619,891 | B2* | 4/2017 | Bose ..................... G06K 9/00342 |
| 9,811,818 | B1* | 11/2017 | Xing ..................... A61B 10/0051 |
| 9,911,045 | B2* | 3/2018 | Bose ..................... G06K 9/00342 |
| 9,911,158 | B1 | 3/2018 | Bueche, Jr. |
| 10,219,122 | B1* | 2/2019 | Scanlon ..................... H04L 51/38 |
| 2012/0295575 | A1* | 11/2012 | Nam ..................... G08B 25/016 455/404.1 |
| 2016/0292881 | A1* | 10/2016 | Bose ..................... G06K 9/00342 |
| 2017/0300755 | A1* | 10/2017 | Bose ..................... G06K 9/00342 |
| 2017/0323285 | A1* | 11/2017 | Xing ..................... A61B 10/0051 |
| 2017/0337478 | A1* | 11/2017 | Sarikaya ..................... G06F 3/167 |
| 2018/0090135 | A1* | 3/2018 | Schlesinger ............ G10L 15/22 |
| 2018/0109649 | A1* | 4/2018 | Bhupati ..................... H04L 67/22 |
| 2018/0146320 | A1* | 5/2018 | Jallo-Jamboria ........ H04W 4/12 |
| 2018/0181854 | A1* | 6/2018 | Koukoumidis ........ G06N 3/006 |
| 2018/0189400 | A1* | 7/2018 | Gordon ............... G06F 17/2785 |

(Continued)

OTHER PUBLICATIONS

Notice of Allowance for 16/024,152 dated Oct. 24, 2018; 12 pages.

*Primary Examiner* — William D Cumming
(74) *Attorney, Agent, or Firm* — Michael D. Downs; Fincham Downs LLC

(57) ABSTRACT

Systems, apparatus, methods, and articles of manufacture provide for receiving a text message from a user; identifying, based on (i) the text message and (ii) at least one intent rule, a message intent associated with the text message; identifying a current state of the conversation based on at least one conversation state rule and at least one of the following: (i) the message intent, (ii) the text message, and (iii) an outgoing message; and outputting the outgoing message to the user.

24 Claims, 5 Drawing Sheets

(56) References Cited

U.S. PATENT DOCUMENTS

2018/0226069 A1\* 8/2018 Fleischman .......... G06Q 10/101
2018/0288211 A1 10/2018 Kim \* cited by examiner

STATE-BASED ELECTRONIC MESSAGE MANAGEMENT SYSTEMS AND CONTROLLERS

CROSS-REFERENCE TO RELATED APPLICATIONS

The present application is a continuation of U.S. patent application Ser. No. 16/024,152, filed Jun. 29, 2018, entitled "STATE-BASED ELECTRONIC MESSAGE MANAGEMENT SYSTEMS AND CONTROLLERS," which is incorporated by reference in the present application.

FIELD OF THE INVENTION

The present invention relates to systems for electronic message management and, more particularly, to improvements in computerized systems for state-based management of interactive message sessions.

BACKGROUND OF THE INVENTION

Some types of processes and systems for automatically reviewing and responding to electronic messages (e.g., text messages) based on static rules (e.g., based on message content) are known.

Some types of interactive messaging and customer service systems rely on communication platforms that suffer from various disadvantages in providing for effective two-way communication, particularly when communication exchanges may be urgent and/or may be interrupted for periods of time. Phone-call-based systems, for example, are not widely used by younger people and do not support the transfer of multimedia files. Email communication is also not widely used by younger people and is not typically looked to or even viable for providing on-demand support. Both phone-call- and text-based systems may be too expensive to staff with enough personnel to be responsive to a large customer base, around-the-clock, for any urgent and/or continuing issues.

Websites and internet-based solutions, including instant messaging, chat, and/or chatbot platforms, do not provide adequate on-demand contact for both participants and lack persistence. For example, when a user of a chat function at a website closes the browser application, the host of the website loses all contact with the user. The conversation must switch to a different form of communication if it is to continue. Communication platforms based on applications for mobile phones and tablets have a relatively low adoption rate, may not be installed or available when needed (e.g., for an urgent matter), and may be operating system, platform, and/or hardware dependent.

Accordingly, such systems have failed to recognize (i) the importance of maintaining and reviewing a plurality or sequence of past and/or current communications and associated states; (ii) adapting responses to communications based on previous conversations and/or previous states for a particular user; and/or (iii) providing an efficient method of two-way communication that allows for on-demand contact among the participants and that supports multimedia messaging options.

SUMMARY OF THE INVENTION

According to some embodiments of the present invention, systems, methods, apparatus, articles of manufacture, and/or computer readable media provide a process for state-based management of electronic messages. In some embodiments, a process for state-based message processing comprises the following steps:
 a) receiving data indicative of at least one intent rule for recognizing a message intent;
 b) receiving data indicative of at least one conversation rule for generating an outgoing message;
 c) receiving data indicative of at least one conversation state rule for identifying a conversation state;
 d) receiving (e.g., from a remote user device associated with a user) a message (e.g., an SMS and/or MMS text message) from a user;
 e) identifying, based on (i) the received message and (ii) the at least one intent rule, a message intent associated with the received message;
 f) generating, based on the received message and the at least one conversation rule, an outgoing message (e.g., to transmit to a remote user device associated with a user);
 g) associating the received message and the outgoing message with a conversation;
 h) identifying a current state of the conversation based on the at least one conversation state rule;
 i) outputting the outgoing message to the user; and
 j) storing an indication of the current state in association with the conversation.

According to some embodiments of the present invention, systems, methods, apparatus, articles of manufacture, and/or computer readable media provide a process for state-based management of electronic messages. In some embodiments, a process for state-based message processing comprises the following steps:
 a) receiving a first user message from a user;
 b) analyzing the first user message using an intent engine;
 c) determining a first state of a conversation based analyzing the first user message;
 d) selecting a first output message based on the first state and the first user message;
 e) transmitting the first output message to the user;
 f) receiving a second user message from the user;
 g) analyzing the second user message using the intent engine;
 h) determining a second state of the conversation based on analyzing the second user message and the first state;
 i) selecting a second output message based on the second state and the second user message; and
 j) transmitting the second output message to the user.

According to some embodiments of the present invention, systems, methods, apparatus, articles of manufacture, and/or computer readable media (e.g., a non-transitory computer readable memory storing instructions for directing a processor of a conversation management controller device) provide a process for state-based management of electronic messages (e.g., by determining an appropriate outgoing message and/or path for further processing). In some embodiments, a process for state-based management of electronic messages comprises the following steps:
 a) receiving as input, into a message intent analysis module, data indicative of at least one intent rule for recognizing a message intent;
 b) receiving as input, into a conversation management module, data indicative of at least one conversation rule for generating an outgoing message;
 c) receiving as input, into a conversation state analysis module, data indicative of at least one conversation state rule for identifying a conversation state;

d) receiving as input, into a message processing module and from a remote user device associated with a user, a text message from the user;

e) identifying, by a message intent analysis module and based on the text message and the at least one intent rule, a message intent associated with the text message;

f) generating, by the conversation management module and based on the text message and the at least one conversation rule, an outgoing message to the user to transmit to the remote user device;

g) associating, by the conversation management module, the text message and the outgoing message with a conversation identifier that identifies a conversation;

h) identifying, by the conversation state analysis module, a current state of the conversation based on the at least one conversation state rule and at least one of the following: the message intent, the text message, and the outgoing message;

i) outputting, by the message processing module via the electronic communications network transceiver device, the outgoing message to the user; and j) storing, by the conversation state analysis module, an indication of the current state in association with the conversation.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

Figure 1:
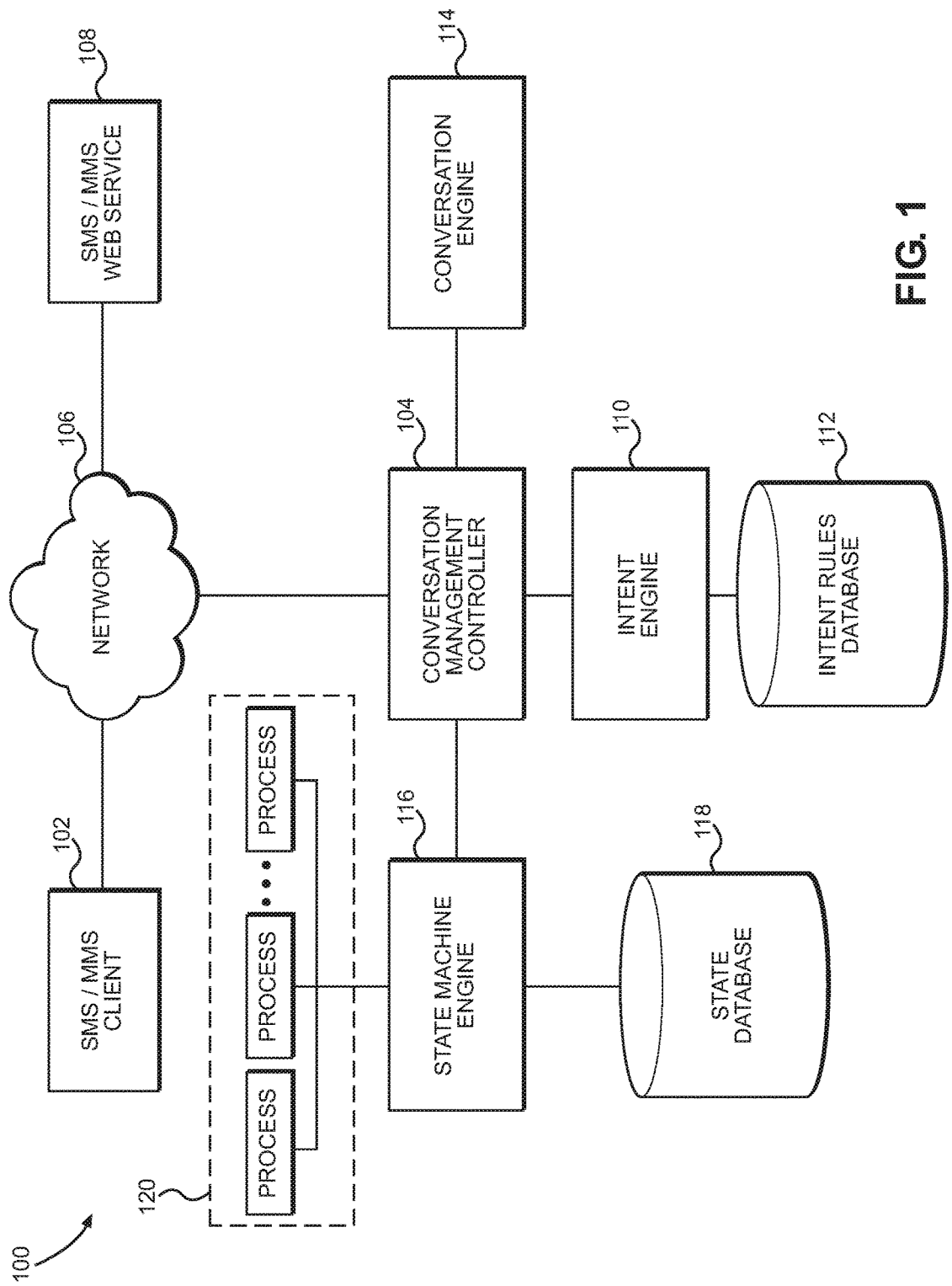
FIG. 1 is a block diagram of a system according to one or more embodiments.

Embodiments presented herein are descriptive of electronic message processing systems, controllers, apparatus, methods, and articles of manufacture for providing state-based message management (SBMM).

The inventors have recognized that currently available processes and systems for managing and responding to communications do not allow for active and intelligent management of the conversations occurring among different users, such as between internal users and users external to an organization or enterprise (e.g., between customer service personnel and a business's customers). While such systems may provide some technical benefit in improving the efficiency with which individual communications may be processed and responded to automatically by email servers, web servers, and chat bots, for instance, they fail to address adequately such technical problems. A rigid rule for a generic auto-reply to a customer's email or text-based message, for example, may result in additional, unnecessary, and inefficient electronic communications, and a corresponding drain on the often-overtaxed resources available in a communication system.

In contrast, the inventors have described in this disclosure various state-conscious and state-based solutions to this technical failing. Various types of electronic message processing systems and methods are provided that can more efficiently receive and process electronic communications, including, but not limited to, providing outgoing or response messages and/or directing or scheduling next actions to be taken. Some embodiments provide for identifying patterns of conversations between and among users over time and/or considering the context of different types of transactions about which users may be communicating. Some embodiments may provide for assessing historical outcomes of such transactions and/or patterns identified in conversations. Accordingly, described in this disclosure are systems and processes that manage electronic communications and related communications systems in manners that avoid or minimize wasted and excessive electronic messaging, specifically, using state-based technical improvements to text-based electronic message handling not previously contemplated.

Some embodiments of the present invention are directed to a text-based messaging platform and related message handling functions. The inventors have recognized that users want to communicate on their own terms and many people prefer text message-based communication (also referred to in this disclosure as "texting") because it is more private that a phone conversation, is intuitive, is self-documenting, and is natively accessible on most devices they carry at all times. Short message service (SMS) and multimedia message service (MMS) text messages are nearly universal services provided by default by most phone carriers. A texting-based platform is advantageous in that a large part of any potential user base will already have a smartphone with texting capabilities, and users will likely require no additional training.

Turning first to FIG. 1, a block diagram of an SBMM system 100 according to some embodiments is shown. According to some embodiments, the SBMM system 100 may comprise a plurality of SMS/MMS clients 102 in communication via a network 106 with an SMS/MMS web service 108 and a conversation management controller 104. The conversation management controller 104 is in communication with a conversation engine 114, an intent engine 110, and a state machine engine 116. The intent engine 110 is in communication with an intent rules database 112 containing a plurality of rules for use in determining an intent of a user message from one of the SMS/MMS clients 102. The state machine engine 116 is in communication with a state database 118 storing respective states of a plurality of conversations managed by the conversation management controller 104. The state machine engine 116 further is in communication with a plurality of various processes 120 for use in conducting respective types of conversations, transactions, and interactions with users.

In one embodiment, an end user's SMS/MMS client 102 comprises the native texting application on their cell phone. Two-way communication between the conversation management controller 104 and the SMS/MMS client may be facilitated by the SMS/MMS web service 108 (e.g., the Twilio web service). The intent engine 110 may comprise natural language processing software that translates user text into a codified intent that can be interpreted by a conversation engine 114 (e.g., the wit.ai web service).

In one or more embodiments, the conversation engine 114 passes specific identified intents to the state machine engine 116, which identifies and generates response messages based on the identified intent (and/or a current state). The state machine engine 116 preferably maintains the state or "memory" of the conversation with the user (e.g., in the state database 118), based on answers in various interview scenarios, and/or stored relevant data, and triggers any one or more of backend business processes 120 (e.g., based on a current state). According to some embodiments, the state database 118 may comprise one or more conversation state rules for use in identifying a conversation state based on text messages and/or past conversation states.

Figure 2:
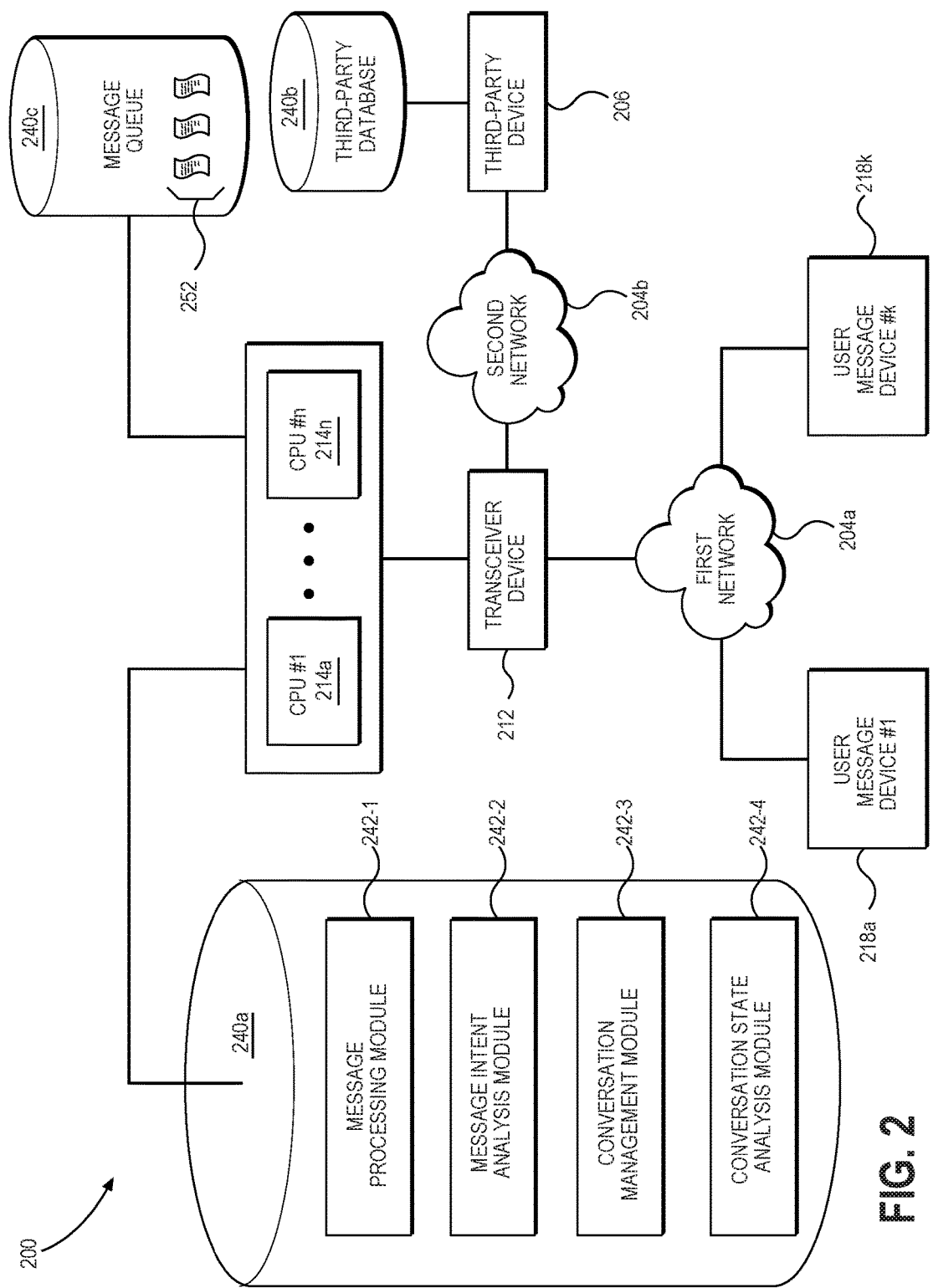
FIG. 2 is a block diagram of a system according to one or more embodiments.

Turning to FIG. 2, in some embodiments, a system 200 may comprise one or more remote user message devices 218a-k, one or more networks 204a-b, a third-party device 206, a transceiver device 212, a plurality of processing devices (e.g., depicted as central processing unit (CPU) devices) 214a-n, and/or one or more databases 240a-c. At least one database may store various types of computer-readable instructions, such as a message processing module 242-1, a message intent analysis module 242-2, a conversation management module 242-3, and a conversation state analysis module 242-4.

In some embodiments, the system 200 may be configured to receive, process, analyze, and/or respond to at least one electronic message in message queue 252, which may include one or more of various types of electronic messages, including but not limited to emails, text messages, voicemails, and/or voice input to an interactive voice response unit (IVRU). According to some embodiments, the message queue 252 may be populated by text messages received (e.g., via one or more of networks 204a-b and/or one or more SMS/MMS web services) by the transceiver 212 and stored in the message queue 252 for processing in accordance with one or more of the message processing module 242-1, message intent analysis module 242-2, conversation management module 242-3, and conversation state analysis module 242-4.

Message queue 252 may include, for example, text messages received by system 200 and queued (e.g., in the order received) for processing, including, in some embodiments, an automated response based on the current state of a conversation and/or on one or more related messages (e.g., previous messages of the same conversation or communication thread). The system 200 may, for example, be specially programmed, as described in this disclosure, to review, parse, store, respond to, analyze, score, and/or transmit messages from message queue 252, in an efficient, state-based manner configured to optimize the use of resources of a network communication system.

Various types of messages are contemplated in this disclosure. In one example, a message may comprise a request for information and/or a request for an action to be taken (e.g., a question about a user's account, a request to set up a visit to a customer, a request for assistance), and may be followed by a responsive outgoing message (e.g., an answer to the user's question, a confirmation that a meeting has been set).

In one example, a customer may request information about automobile maintenance. The conversation management system may use natural language interpretation, for example, to understand that the customer is interested in learning about tire maintenance and repair. On processing the message, the SBMM system may return to the customer, or route the customer to, an existing web page via a link in a text message, the web page containing the requested information.

Fewer or more of the components depicted in FIG. 2 (and/or portions thereof) and/or various configurations of the components may be included in the system 200 without deviating from the scope of embodiments described in this disclosure. While multiple instances of some components are depicted and single instances of other components are depicted, for example, any component depicted in the system 200 may comprise a single device, a combination of devices and/or components, and/or a plurality of devices, as is or becomes desirable and/or practicable for a particular implementation. Similarly, in some embodiments, one or more of the various components may not be needed and/or desired in the system 200. According to some embodiments, the system 200 may be configured to implement, conduct, and/or facilitate the execution of various data processing procedures, such as the conversation management processing procedures described in accordance with the example methods of this disclosure (or portions and/or combinations of such methods).

As used herein, a "user message device" is a subset of a "user device" (defined below) and specifically comprises one or more components facilitating electronic communication of messages with one or more other computing devices. A user message device, a user device associated with a particular user or users, may facilitate the generation and/or transmission of messages by one or more users (e.g., by a user entering and sending an email message using a smartphone) and/or by the user message device itself (e.g., an auto-generated message from a tablet computer or other network device associated with a user). Further, a user message device may receive messages generated and/or transmitted by one or more users and/or by one or more other types of network devices (e.g., a conversation management server).

According to some embodiments, the user message devices 218a-k may comprise any types or configurations of computing, mobile electronic, telephone, network, user, and/or communication devices practicable for providing and/or receiving electronic messages. The user message devices 218a-k may, for example, comprise one or more personal computer (PC) devices, computer workstations (e.g., claim adjuster and/or handler workstations), tablet computers such as an iPad® manufactured by Apple®, Inc. of Cupertino, Calif., and/or cellular and/or wireless telephones such as an iPhone® (also manufactured by Apple®, Inc.) or an Optimus™ F7 smart phone manufactured by LG® Electronics, Inc. of San Diego, Calif., and running the Android® operating system from Google®, Inc. of Mountain View, Calif. In some embodiments, the user message devices 218a-k may comprise devices owned and/or operated by one or more remote users such as customers, agents (e.g., insurance agents), employees of a business, and/or other users (e.g., claims handlers for an insurance company).

In some embodiments, one or more of the user message devices 218a-k are in electronic communication with (and/or electronically and/or communicatively coupled to) a first network 204a. The first network 204a may, for example, electronically and/or communicatively connect one or more of the user message devices 218a-k with the transceiver device 212. In some embodiments, the user message devices 218a-k may provide messages and/or other types of data via the first network 204a and to the transceiver device 212.

According to some embodiments, the networks 204a-b may comprise one or more local area networks (LAN; wireless and/or wired), cellular telephone, Bluetooth®, near field communication (NFC), and/or radio frequency (RF) networks with communication links between any or all of the user message devices 218a-k, the third-party device 206, and/or the transceiver device 212. In some embodiments, the networks 204a-b may comprise direct communications links between any or all of the components of the system 200. The user message devices 218a-k may, for example, be directly interfaced or connected to transceiver device 212 via one or more wires, cables, wireless links, and/or other network components, such network components (e.g., communication links) comprising portions of the first network 204a. In some embodiments, the networks 204a-b may comprise one or many other links or network components other than those depicted in FIG. 2. The user message devices 218a-k may, for example, be connected to the transceiver device 212 via various cell towers, routers, repeaters, ports, switches, and/or other network components that comprise the Internet and/or a cellular telephone (and/or public switched telephone network (PSTN)) network.

While the networks 204a-b are depicted in FIG. 2 as a single and/or separate objects, the networks 204a-b may comprise any number, type, and/or configuration of networks that are or become known or practicable. According to some embodiments, the networks 204a-b may comprise a conglomeration of different sub-networks and/or network components interconnected, directly or indirectly, by the components of the system 200. The networks 204a-b may comprise one or more cellular telephone networks with communication links between the user message devices 218a-k and the transceiver device 212, for example, and/or may comprise the Internet, with communication links between the transceiver device 212 and the third-party device 206 and/or the databases 240a-c, for example.

In some embodiments, a second network 204b may electronically and/or communicatively connect the transceiver device 212 to the third-party device 206. The third-party device 206 may, for example, be in electronic communication with (and/or electronically and/or communicatively coupled to) the second network 204b. In some embodiments, the third-party device may provide data to the transceiver device 212. The third-party device 206 may, for example, access data stored in a third-party database 240b and provide the data to the transceiver device 212 (e.g., upon request and/or command, such as in response to a database query initiated and/or conducted via the transceiver device 212).

According to some embodiments, the third-party device 206 may comprise any type or configuration of a computerized processing device such as a PC, laptop computer, computer server, database system, and/or other electronic device, devices, or any combination thereof. In some embodiments, the third-party device 206 may be owned and/or operated by a third-party (i.e., an entity different than any entity owning and/or operating any of the user message devices 218a-k and/or or the transceiver device 212). The third-party device 206 may, for example, be owned and/or operated by a third-party message service provider (e.g., a message service provider utilizing the Twilio Platform™ communications platform and software). In some embodiments, the third-party device 206 may supply and/or provide data such as current or historic message data to the transceiver device 212. In some embodiments, the third-party device 206 may comprise a plurality of devices and/or may be associated with a plurality of third-party entities.

In some embodiments, the transceiver device 212 may receive data from either or both of the first network 204a and the second network 204b and provide the received (and/or retrieved) data to one or more of the processing devices 214a-n. The transceiver device 212 may, for example, act in command of or otherwise in response to one or more of the processing devices 214a-n to provide data acquired from the user message devices 218a-k and/or the third-party device 206, such as to facilitate and/or conduct processing of incoming and/or outgoing messages for conversation management.

According to some embodiments, the transceiver device 212 may comprise any type and/or configuration of bi-directional electronic communication device that is practicable for a desired implementation. The transceiver device 212 may comprise, for example, a printed circuit board (PCB) device configured with appropriate electronic pathways, traces, and/or circuitry components (such as capacitors, resistors, transducers, transistors, diodes, and/or inductive devices) for receiving and transmitting electronic information packets in accordance with one or more transmission protocols such as the Internet Protocol Version 6 (IPv6) standard.

In some embodiments, the processing devices 214a-n may receive and/or acquire data from the transceiver device 212 (e.g., directly and/or via one or more networks or network components not explicitly depicted in FIG. 2). One or more of the processing devices 214a-n may, for example, execute instructions, rules, and/or logic programmatically defined by one or more of the message processing module 242-1, the message intent analysis module 242-2, the conversation management module 242-3, and/or the conversation state analysis module 242-4 (each stored in a database 240a accessible to the processing devices 214a-n), such instructions (as described in detail in this disclosure) causing the transceiver device 212 to acquire and/or receive various data inputs (e.g., from the user message devices 218a-k, the message queue 252, and/or the third-party device 206 (and/or the third-party database 240b)). In some embodiments, the processing devices 214a-n may comprise one or more multi-core CPU devices such as an Intel® Xeon® Processor E7-2890 v2 and/or one or more cores and/or processing threads thereof.

According to some embodiments, the databases 240a-c may comprise any type, configuration, and/or quantity of data storage devices that are or become known or practicable. The databases 240a-c may, for example, comprise an array of optical and/or solid-state hard drives configured to store policy, customer, weather, staffing, workload, and/or location data provided by (and/or requested by) the user message devices 218a-k and/or the third-party device 206, and/or various operating instructions, drivers, etc.

While the databases 240a-c are depicted as a stand-alone and/or separate components of the system 200 in FIG. 2, the databases 240a-c may comprise multiple components. In some embodiments, a multi-component database 240a-c may be distributed across various devices and/or may comprise remotely-dispersed components. Any or all of the user message devices 218a-k, the transceiver device 212, the processing devices 214a-n, and/or third-party device 206 may comprise the databases 240a-c or a portion thereof, for example.

While several examples are described in this disclosure as related to SMS/MMS-based text messaging, various types of communications formats, protocols, and networks are contemplated for use with one or more embodiments of a conversation management system. Electronic messages may be embodied, for example and without limitation, as one or more of:

a) a voice message,
  b) an SMS message,
  c) an MMS message,
  d) a message received via a browser application,
  e) a message received from a mobile device,
  f) a message received via Internet from a user device, g) an email message, and/or h) an instant message (IM).

Any of the networks 204*a-b* may provide for one or more of the corresponding services configured to provide for one or more types of electronic messaging.

Various embodiments of the present invention comprise at least one state machine engine. In one example, a conversation management system may comprise an application (e.g., a web application) comprising a decision engine. The decision engine provides for event processing of events from the application based on a state machine. For example, the decision engine may receive messages from the application and use the state machine to determine a next state, as discussed below with respect to various embodiments, based on state transition model data. State transition model data (e.g., an XML file) preferably describes event processing in such a way that the decision engine is neutral with respect to the events and entities with which it interacts. In some embodiments, the decision engine may emit messages according to the state transition model data, and the emitted messages may queue (e.g., via a message bus) for waiting event receivers (e.g., a conversation management application, other applications and services) that have registered for the events.

The configuration of states and transitions in state model data may be expressed in any number of formats (e.g., JavaScript Object Notation (JSON) text-based data-interchange format, custom XML, Spring Web Flow XML-based flow definition language from SpringSource). In some embodiments, the state transition model data defines at least one finite state machine in terms of states and transitions. For each type of state transition, the state transition model data specifies the computational elements that are associated with that transition. A computational element is an action that is performed upon occurrence of the transition with which the computational element is associated. Thus, the actions that result from a state machine transition may be changed by modifying the state transition model data (e.g., revising an XML specification).

According to some embodiments, a state machine engine of an SBMM is responsible for deciding what the next state of a conversation should be based on information about the current state and the name of an event (e.g., received from a conversation management controller application). According to some embodiments, the design of a state machine engine may utilize one or more different types of defined states.

Every defined state may have an associated ID, an associated type, a list of associated state events that it recognizes by name, and a map of transitions that are keyed by name to state events. In accordance with some embodiments, a sub-flow state composes any number of other states into a sub-flow having a distinct entry point and a distinct exit point.

According to various embodiments described in this disclosure, systems, methods, apparatus, and software applications stored, for example, on computer-readable storage devices or other media, may utilize a state machine for carrying out the processes and functions of a conversation management controller application. The defined processes of the application or program (e.g., the flows, functions, other components, etc.) may be executed in accordance with one or more defined states. In one example, a value of a state variable indicates a corresponding state. A method checks for a current value of the state variable. Any given function or step within any given state (e.g., an action state), or input received from a user, such as through different text messages received from a user via an SMS/MMS interface, can return a value for the state variable. In some embodiments, when a method determines a value of the state variable, an object corresponding to the state indicated by the determined value is enabled.

In one example implementation, a customer assistance framework using a state machine may be installed in a conversation management application, the customer assistance framework describing every possible state and transition for assisting various types of customers with various types of requests. The operation of such an application may include receiving an incoming text message from a user by an application controller that manages application flow and logic. The text messages sent to the application server are translated into event objects that are meaningful for the application. Then, the events are passed to a conversation engine that processes the event according to an identified intent of the text message and a state machine definition (e.g., based on a state transition model data). After event handling and a new application state has been determined, output of an outgoing message to the user based on that new state is triggered.

Figure 3:
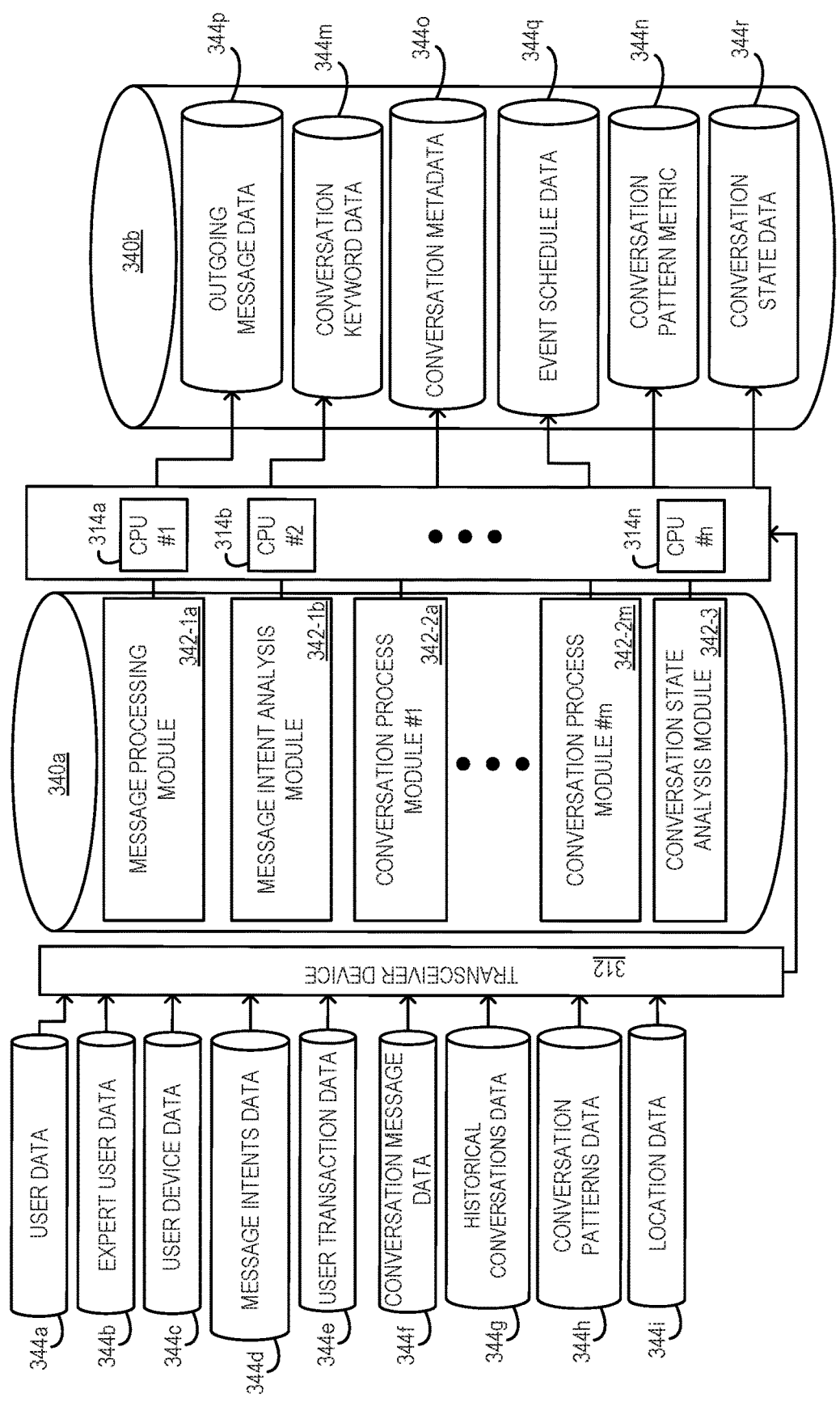
FIG. 3 is a block diagram of a system according to one or more embodiments.

Turning to FIG. 3, a block diagram of a system 300 according to some embodiments is shown. In some embodiments, the system 300 may comprise one or more user message devices (e.g., one or more user message devices 218*a-k* of FIG. 2 that are "outside" message devices external to an enterprise or business and/or "inside" message devices internal to an enterprise or business), one or more networks (e.g., a first "outside" network 204*a* and/or a second "inside" network 204*b* as shown in FIG. 2), a transceiver device 312, a plurality of processing devices (e.g., depicted as CPU devices) 314*a-n*, and/or one or more databases 340*a-b* (such as a first database 340*a* and/or a second database 340*b*).

In some embodiments, the databases 340*a-b* may store various programs, stored instruction sets, and/or programmatic modules, such as a message processing module 342-1*a*, a message intent analysis module 342-1*b*, one or more conversation process modules (e.g., a first conversation process module 342-2*a* and/or an mth conversation process module 342-2*m*), and/or a conversation state analysis module 342-3.

According to some embodiments, various data elements and/or values thereof may be received by, determined by, utilized by, and/or calculated or derived by the system 300. Inputs to the system 300 may comprise, for example, user data 344*a*, expert user data 344*b*, user device data 344*c*, message intents data 344*d*, user transaction data 344*e*, conversation message data 344*f*, historical conversations data 344*g*, conversation patterns data 344*h*, and/or location data 344*i*. In some embodiments, outputs and/or variables derived and/or defined by the system 300 may comprise conversation keyword data 344*m*, conversation pattern metric 344*n*, conversation metadata 344*0*, outgoing message data 344*p*, event schedule data 344*q*, and/or conversation state data 344*r*.

In some embodiments, any or all input data elements (e.g., data items 344*a-i*) may be received by the transceiver device 312 from one or more external and/or remote devices, such as user message devices (and/or one or more other devices not shown in FIG. 3). According to some embodiments, the transceiver 312 may direct and/or route various information packets representing (and/or descriptive of) the data items 344*a-i* to one or more of the processing devices 314*a-n* for use in executing one or more of the various individual instruction modules and/or specific combinations thereof (e.g., stored in the first database 340*a*).

The user data 344a, expert user data 344b, user device data 344c, user transaction data 344e, conversation message data 344f (e.g., embodied as and/or received from a stored queue of messages), and/or location data 344i may, for example, be provided to and/or processed by the message processing module 342-1a (e.g., as executed by, for example, a first processing device 314a). In some embodiments, message processing module 342-1a may act as a controller or master module with respect to one or more other modules (including any of the modules depicted in FIG. 3). In one example, the message processing module 342-1a may pass conversation message data 344f (e.g., one or more text messages) to message intent analysis module 342-1b for determining what type of message a user has provided (or intended to provide).

In some embodiments, user data 344a and/or user device data 344c may comprise, for example, a telephone number or other identifier that identifies a user and/or a user's device. In one example using a mobile device's telephone number, the provided telephone number may be checked to see if it is correct (e.g., if it matches any user's account). Once a user is identified, information related to the user (e.g., a corresponding insurance policy, a customer order number, etc.) may be located (e.g., in user transaction data 344e).

Message intent analysis module 342-1b may receive (e.g., have passed to it by message processing module 342-1a and/or transceiver device 312) message intents data 344d for use in comparing keywords (e.g., keywords associated with stored definitions of message intents) with the contents of messages (e.g., text messages from users). Message intents data 344d may comprise one or more intent rules for recognizing message intent. In one embodiment, message intent analysis module 342-1b may comprise or cause to execute a natural language processor module for identifying, using a natural language processing algorithm (e.g., the Alchemy™ natural language processing API), one or more terms or other keywords in a text message. The module 342-1b may then compare any identified keywords with predefined keywords in the message intents data 344d to determine what type of message a user has provided (e.g., an inquiry, a request for assistance, a request for a specific document or other information, a request for an expert or consultant on a particular subject, and so on). Once identified, any keywords found in messages may be transmitted and/or stored (e.g., as conversation keyword data 344m). In one embodiment, an indication of one or more message intents found by message intent analysis module 342-1b to be good matches, based on the message content, for a text message, may be passed to message processing module 342-1a, conversation state analysis module 342-3, and/or to one of the conversation process modules for additional processing, and/or to database 340b for storage.

According to some embodiments, as discussed in this disclosure, a user message may be processed by the conversation state analysis module 342-3 to derive one or more states to assign to the corresponding conversation.

In some embodiments, the conversation message data 344f and one or more of the other types of data items indicated in FIG. 3 may be processed by the message processing module 342-1a, the message intent analysis module 442-1b, the conversation state analysis module 342-3, and/or one of the conversation process modules to determine, automatically, the content of an appropriate outgoing message. According to some embodiments, the conversation message data 344f may comprise one or more conversation rules for generating outgoing messages (e.g., based on one or more states and/or one or more text messages).

In some embodiments, the message processing module 342-1a and/or one of the conversation process modules may determine at least one event to schedule (e.g., as represented by event schedule data 344q). In one example, an action, event, or appointment may be scheduled for the future, with respect to a conversation (e.g., follow up with a customer in one week by text; schedule an adjuster visit for a damage claim on an insurance policy) and/or with respect to a transaction related to the conversation.

According to some embodiments, conversation process module may comprise and/or be in communication with an event scheduler, such as a messaging, appointment, and/or productivity application (e.g., the Outlook® productivity and messaging application and/or Exchange Server 2013™ productivity and messaging server application by Microsoft, Inc.). In one or more embodiments, the event scheduler may be configured (e.g., with computer-readable software instructions) to receive and/or store event schedule data 344q, and to automatically initiate scheduled events when they are due (e.g., to automatically transmit a previously defined text message to a recipient at a scheduled time).

In some embodiments, one or more of the message processing module 342-1a, message intent analysis module 342-1b, conversation state analysis module 342-3, and/or a conversation process module may determine metadata associated with one or more messages. In one example, information about a user who sent a text message and/or information about an account of a user (e.g., user transaction data 344e) may be used to collect metadata associated with a particular message, and which may be output and/or stored as conversation metadata 344O. In one example, conversation metadata 344O for a message relevant to an insurance policy may include an insurance policy number, an insurance claim number, a premium amount, and/or a claim settlement amount.

According to some embodiments, any or all of the output data 344m-r may be stored in a second database 340b, as depicted. In some embodiments, upon execution of the instruction modules by one or more of (or two or more of, in some embodiments) the processing devices 314a-n, the second database 340b may be populated with data descriptive of and/or defining the output data 344m-r. FIG. 3 depicts an example data processing flow that shows, in accordance with some embodiments, how the input data elements 344a-i may be processed through the system 300 by the transceiver device 312 and the execution of the instruction modules by the processing devices 314a-n, to produce the output data 344m-r.

According to some embodiments, any or all of the input data 344a-i may comprise one or more of the types of information described for output data 344m-r. In one example, the conversation message data 344f, historical conversations data 344g, and/or conversation patterns data 344h may comprise one or more of stored outgoing message data 344p, conversation keyword data 344m, and/or conversation metadata 344O.

Figure 4:
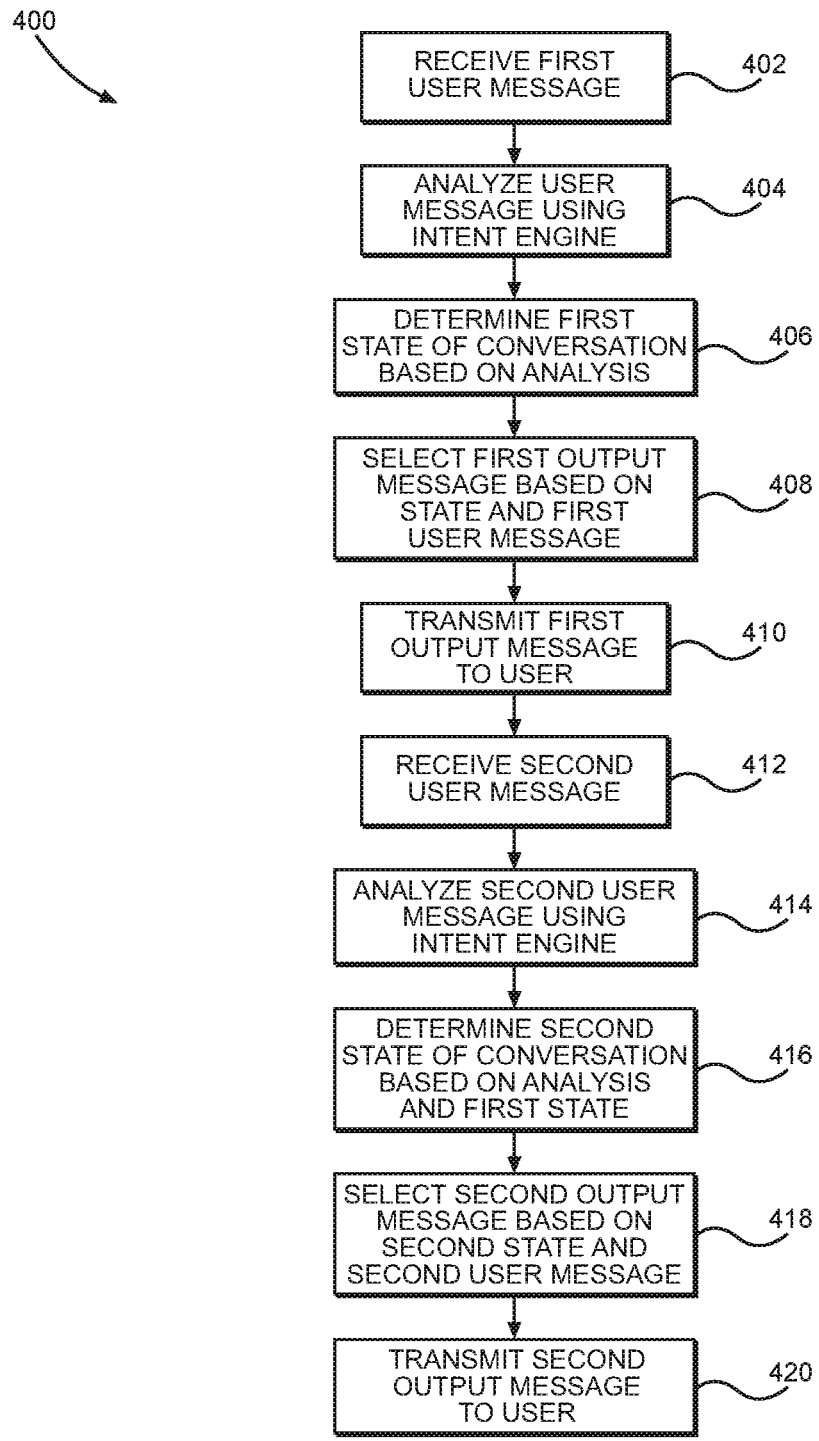
FIG. 4 is a flowchart of a method according to one or more embodiments.

Referring now to FIG. 4, a flow diagram of a method 400 according to some embodiments is shown. In some embodiments, the method 400 may be performed and/or implemented by and/or otherwise associated with one or more specialized (e.g., specially-programmed as opposed to generally-programmed) and/or computerized processing devices (e.g., the conversation management controller 104, processing devices 214a-n, 314a-n, of FIG. 2 and/or FIG. 3), specialized computers, computer terminals, computer servers, computer systems and/or networks, and/or any combinations thereof (e.g., by one or more multi-threaded and/or multi-core processing units of an insurance company electronic message processing system). In some embodiments, the method 400 may be embodied in, facilitated by, and/or otherwise associated with various input mechanisms and/or interfaces.

In some embodiments, the method 400 may comprise receiving (e.g., by a processing device and/or by a transceiver device and/or via an electronic communications network) a first user message (e.g., an SMS or MMS text message), at 402, and analyzing the first user message using an intent engine, at 404. For example, receiving the first user message may comprise receiving an SMS text message from a user's smart phone or other mobile device. Analyzing the first user message may comprise identifying keywords in the first user message (e.g., using a conversation engine and/or natural language processing), and identifying information, an interaction, a transaction, or a request for assistance based on the identified keywords (e.g., using an intent engine to analyze the identified keywords). For example, an intent analysis module may compare the first user message to one or more other text messages stored in a database of previous messages, to identify a pattern associated with a predefined intent.

At 406 the method 400 may further comprise determining a first state of the conversation based on the analysis at 404. For example, in response to a text message of "Help" transmitted to a predefined number associated with accident assistance, a conversation management controller device may determine to assign a first conversation state of "INITIAL_CONTACT_ACCIDENT" to the initiated conversation (e.g., a default initial state for a conversation determined to be related to an automobile accident or other type of vehicular accident). In one or more embodiments, a SBMM system will store an indication of the determined state in association with the conversation (e.g., in association with an identifier that identifies the conversation, in a conversation database).

The method 400 may further comprise selecting a first output message based on the state and the first user message, at 408, and transmitting the first output message to the user, at 410. For example, a conversation management controller may select from a plurality of potential response templates based on the determined state and may modify a selected response template based on the first text message. For instance, following a "Help" text and considering an initial state of "INITIAL_CONTACT_ACCIDENT," the conversation management controller may generate an example output message of "We're here to help. Do you require immediate medical assistance?"

In some embodiments, the method 400 may comprise receiving a second user message, at 412, and analyzing the second user message using the intent engine, at 414. For example, the second user message may comprise receiving a second text message from the user's smart phone. Analyzing the second user message, as discussed above with respect to step 404, may comprise identifying information, an interaction, a transaction, or a request for assistance based on identified keywords. For example, an intent analysis module may analyze a second user message of "No. Fender bender. What now." Based on the intent analysis, a conversation management controller may determine that (a) the user does not require medical assistance, (b) the user is describing accident damage, and (c) the user is requesting instructions on what to do next.

According to some embodiments, analyzing a user message using an intent engine may comprise determining an identified conversation pattern (e.g., as stored in association with the pattern in a database). The method 400 may comprise determining a message based on the identified conversation pattern (e.g., based on the definition of the pattern, the next preferred message in sequence may be identified).

The method 400 may further comprise determining, at 416, a second state of the conversation based on the preceding analysis (at 404 and/or 414) and the first state. For example, in response to the example second user message above, a conversation management controller of an SBMM system may elect to assign one or more new conversation states to the conversation, replacing an initial state of "INITIAL_CONTACT_ACCIDENT." For instance, the SBMM system may assign a state of "NO_MEDICAL" to indicate the user reported no medical assistance is necessary, a state of "VEHICLE_DAMAGE" to indicate that the user indicated his or her vehicle was damaged, and also a state of "VERIFY_DRIVER_INFO" to indicate the accident assistance process has moved into an information collection and verification phase. Alternatively, or in addition, a state may be generated, selected, or otherwise determined that is representative of two or more of various statuses for a given conversation (e.g., "MED:NO|VEHICLE_DMG:YES-|VERIFY:01"; "410.73.XYZ").

According to some embodiments, any state associated with a conversation in an SBMM system may be stored and accessed as necessary for managing conversations with a user. For example, a user may interact with an SBMM system with a first series of messages (e.g., on a day of a vehicular accident) and then may re-establish the conversation later (e.g., a few days later) by sending a new message to the system. The SBMM system will be able to access the current state of the conversation by accessing any stored current state of the conversation (e.g., in a conversation database) based on a conversation identifier and/or the mobile device the user is using to send messages. Based on the retrieved status, the SBMM system can provide an output message based on the new message, one or more previous messages, and/or the stored state, allowing the conversation to continue effectively where it had left off.

The method 400 may further comprise selecting a second output message based on the second state and the second user message, at 418, and transmitting the second output message to the user, at 420. For example, a conversation management controller of an SBMM system may select from a plurality of potential response templates based on the determined state(s) and may modify a selected response template based on the second text message and/or the first text message (and/or one or more additional text messages comprising part of the tracked conversation).

According to one example scenario for implementing a texting-based message processing platform, an insurance provider uses SMS and MMS to offer services across all of its personal products for a variety of services and transactions, including, but not limited to, allowing a customer to make coverage limit inquiries, initiate a claim, add a car or driver to a policy, add personal property to a policy, etc. For the reasons discussed regarding the state-based technical innovations in this disclosure, the example service can focus on customers' needs and communicate with them in a manner that-though entirely automated and not requiring full-time, around-the-clock staffing-feels personal, prompt, and responsive, and allows for sending and receiving multimedia messages and linking out to related websites. The messaging platform comprises an intelligent chat bot that maintains memory of a customer's current and prior conversations, so that a conversation can be dropped and then picked up at any point in the future, without having either party explain the previous conversations.

The method 400 may further comprise, in some embodiments, identifying at least one processing service to initiate (e.g., based on a current state of a conversation) and/or transmitting a signal (e.g., to a processing device associated with the processing service) to initiate the processing service in association with the user. For example, a state machine engine may trigger a signal to a service for contacting local auto body shops to schedule a tow service for a customer having car trouble. Processing services may include, for example, emergency services and/or roadside assistance services.

Figure 5:
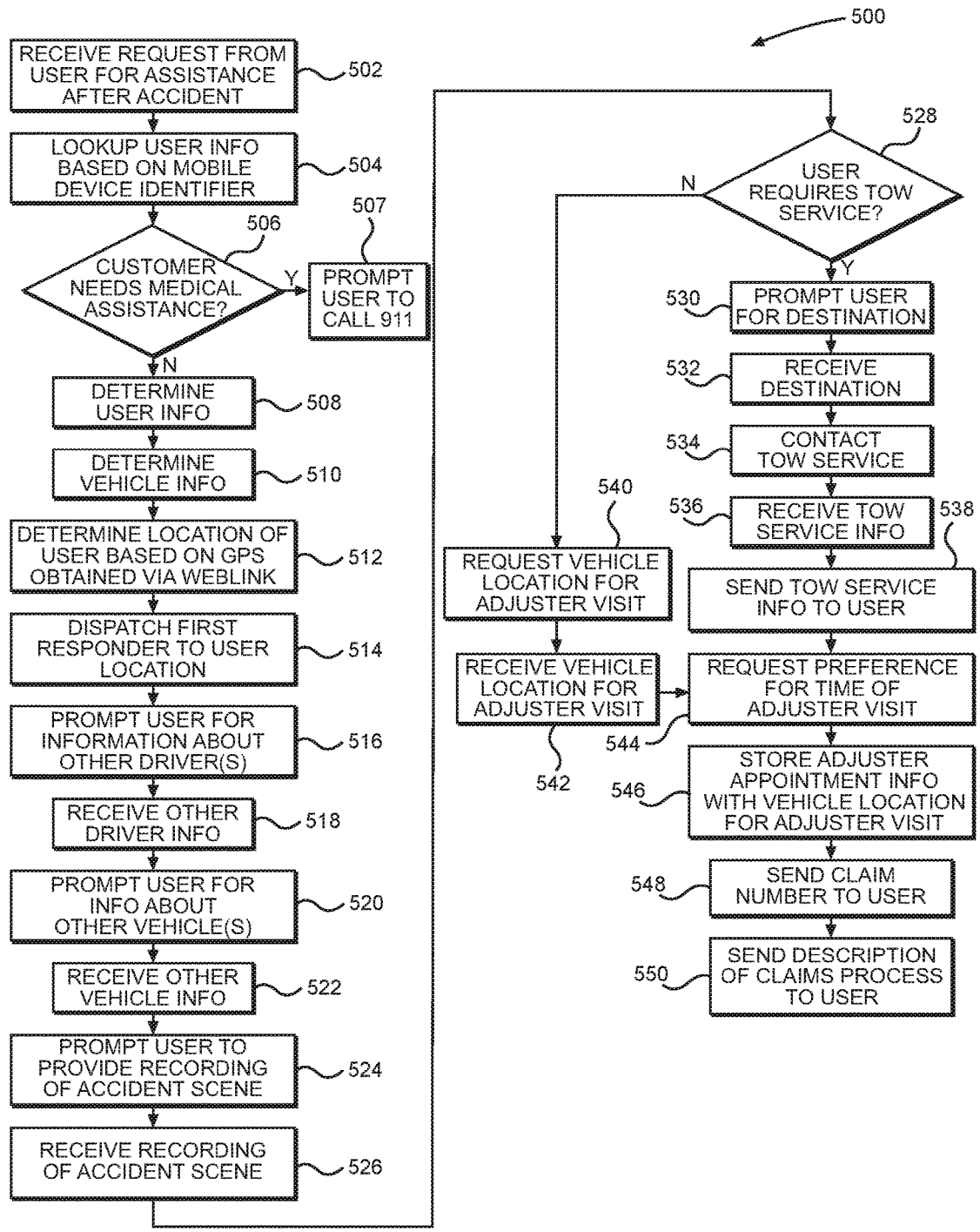
FIG. 5 is a flowchart of a method according to one or more embodiments.

Referring now to FIG. 5, a flow diagram of a method 500 consistent with the example scenario is shown. In some embodiments, the method 500 may be performed and/or implemented by and/or otherwise associated with one or more specialized (e.g., specially-programmed as opposed to generally-programmed) and/or computerized processing devices (e.g., the conversation management controller 104, processing devices 214*a-n*, 314*a-n*, of FIG. 2 and/or FIG. 3), specialized computers, computer terminals, computer servers, computer systems and/or networks, and/or any combinations thereof (e.g., by one or more multi-threaded and/or multi-core processing units of an insurance company's electronic message processing system). In some embodiments, the example method 500 may be embodied in, facilitated by, and/or otherwise associated with various input mechanisms and/or interfaces.

In some embodiments, the method 500 may comprise receiving (e.g., by conversation management controller of an SBMM system) a text message from a user requesting assistance after an automobile accident, at 502. The text message is associated with or includes a mobile device identifier that identifies the mobile device the user used to send the first text message. For example, following an auto accident, one of the drivers, a customer of an insurance company, uses her mobile phone to send a text message of "Help" to a text number pre-assigned by the insurance company for assistance with automobile accidents. The method 500 may further comprise looking up information associated with the user based on the mobile device identifier, at 504. For example, the user's mobile phone number may be associated with information about an automobile insurance policy.

The method 500 may further comprise determining if the user requires medical assistance, at 506. For example, a conversation management controller may send a text message to the user asking if the user requires medical attention and analyzing the user's response. If the user does indicate that she requires medical assistance (e.g., based on analysis of the user's response using an intent engine and/or conversation engine), the method 500 may further comprise sending the user an output message in response prompting the user to call 911, at 507.

After determining if the customer needs medical assistance and/or prompting the user to call 911, the method 500 may further comprise determining information about the user, at 508, and determining information about the user's vehicle, at 510. For example, the conversation management controller may look up information about the user and/or the user's vehicle in information associated with an automobile insurance policy that is associated with the user's mobile phone number.

The method 500 may further comprise determining a location of the user based on GPS coordinates obtained via a weblink, at 512. For example, the conversation management controller may transmit to the user a uniform resource locator (URL) address of a web service that, when selected by the user, obtains the GPS location of the user's mobile device and transmits the GPS location to the conversation management controller.

The method 500 may further comprise dispatching a first responder to the user's location, at 514. For example, the SBMM system may transmit a request for assistance with the automobile accident to a local police department, a local fire department, and/or a 911 emergency service, based on the GPS location.

The method 500 may further comprise prompting the user (e.g., by transmitting a text message to the user requesting information) to provide information about any other drivers involved in the automobile accident, at 516; prompting the user (e.g., by transmitting a text message to the user requesting information) to provide information about any other vehicles involved in the automobile accident, at 520; and prompting the user (e.g., by transmitting a text message to the user requesting the user make a recording) to provide a recording of the accident scene, at 524. For example, the SBMM system may transmit to the user a text requesting that the user acquire information about the other driver(s) and/or vehicles, such as name, address, insurer, vehicle make and model, and the like. In one example, the SBMM system may request that the user obtain and transmit an image of the other driver's insurance card, an image of the license plate of the other vehicle, an image of the automobile accident location (e.g., a wide-angle digital image of the accident scene), and/or an image of the user's vehicle and/or any other vehicles involved in the accident. The method 500 may further comprise receiving (e.g., via a text message) information about one or more other drivers (e.g., a digital image transmitted via MMS), at 518; receiving (e.g., via a text message) information about any other vehicles, at 522; and/or receiving (e.g., via a text message) a recording of the accident scene (e.g., a digital recording transmitted via MMS), at 526.

According to the example scenario, the method 500 may further comprise asking the user if the user requires a tow service to tow their vehicle, at 528. If so, the method 500 may further comprise prompting the user to provide a destination for the towed vehicle, at 530; receiving an indication of the destination, at 532; contacting a tow service, at 534; receiving information about the tow service, at 536; and sending the information about the tow service to the user, at 538.

For example, the SBMM may transmit to the user an offer by text message for a tow truck (e.g., "Does your vehicle need to be towed"). If the user replies that they would like a tow truck, the SBMM may then ask the user to provide an indication of the destination (e.g., home, auto body shop, other, etc.). In some embodiments, the SBMM may retrieve information about auto body shops near the user's current location and/or near the user's home and provide this information to the user via a text message and/or via a weblink texted to the user. If the user selects or otherwise indicates a destination, the SBMM may store an indication of the indicated destination. If the user selects an auto body shop, the SBMM may contact the towing service and receive in response the company name, tow truck driver's name and contact number, and, if available, an estimated time of arrival of a tow truck at the user's current location.

If the user declines the offer for a tow service at 528, the SBMM may request the user indicate a location at which an adjuster could visit the vehicle, at 540, and receive an indication of the location from the user, at 542.

Whether the user elected to have a tow service tow the vehicle or not, the method 500 may further comprise, if appropriate, requesting a preference for a time of an adjuster visit, at 544, and storing information about an adjuster visit in association with the vehicle location for the adjuster visit (e.g., at the user's home, at a local auto body shop to which the car was or is to be towed, etc.), at 546.

The example method 500 may further comprise transmitting an insurance policy claim number for the automobile accident to the user, at 548, and sending a description of the claims process (e.g., a description of next steps to be taken by the user and/or the insurance company in processing a claim on the automobile policy) to the user, at 550.

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

Throughout the description herein and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

Some embodiments described herein are associated with a "module." As utilized herein, the term "module" may generally be descriptive of any combination of hardware, electronic circuitry and/or other electronics (such as logic chips, logical gates, and/or other electronic circuit elements or components), hardware (e.g., physical devices such as hard disks, solid-state memory devices, and/or computer components such as processing units or devices), firmware, and/or software or microcode.

Some embodiments described herein are associated with a "conversation." As utilized herein, the term "conversation" is generally descriptive of one or more messages transmitted between one message device or communication system to another message device or communication system. In one example, a conversation may consist of only a single text message sent by a user to a company's technical support email address. In another example, a conversation may comprise two or more communications from one party to another, such as a sequence of text messages sent between a customer and an automated customer support platform. In another example, a conversation may comprise all of the following: (i) a first text message sent from a user to a business's predefined text number, which is received by a conversation management system for processing the first text message by or on behalf of the business; (ii) a second text message sent from the conversation management system to the user based on processing of the first text message; (iii) a third text message from the user to the business's text number, for instance, providing additional information; and (iv) a fourth text message automatically sent from the business's customer support platform to the user (e.g., answering the user's inquiry). Accordingly, in the preceding example, the "conversation" describes the communication steps between the user and the conversation management system of the customer support platform.

As utilized herein, the term "message" is generally descriptive of a communication (e.g., an electronic message, such as a text message, email, or the like) sent from one message device or communication system to another message device or communication system.

A conversation may be described in this disclosure as having one or more of: (i) a "conversation sequence" or "order" to a plurality of such messages, and (ii) a "conversation outcome" or "result" of the conversation. Conversation sequences and outcomes may be useful, in accordance with some embodiments, for identifying and/or creating one or more conversation patterns or models.

Some embodiments described in this disclosure are associated with a "conversation pattern." As used in this disclosure, "conversation pattern" defines an actual, composite, or generated definition of a conversation (e.g., one or more electronic messages). A conversation pattern may be defined, for example, using one, some, or all of the following types of information: (i) one or more messages; (ii) a respective message intent for each message defined for the conversation pattern; (iii) sequence information defining an order of the conversation messages in the defined conversation pattern; and/or (iv) information associated with a transaction corresponding to the defined conversation pattern (e.g., a proposed business transaction; the subject matter of a customer's request to a business).

Some embodiments described in this disclosure are described as associated with a "transaction" or a "user transaction." As used in this disclosure, "transaction" and "user transaction" are used to describe generally any contextual information relevant to one or more conversations. (Such contextual transaction information may also be referred to in this disclosure as "metadata" for a conversation or message.) In one example, a transaction may refer to the purpose of a user's conversation, such as to acquire customer support, or to make a request to renew a subscription or insurance policy, and the associated transaction data may include, for example, a user's account number. Accordingly, transaction information may include additional contextual information about an account, purchase, agreement, inquiry, etc., that is associated with a conversation. In one example, transaction information relevant to a conversation involving communication about an insurance policy claim or policy renewal may include information about an insurance policy (e.g., a policy number), an insurance claim (e.g., an insurance claim number), a premium amount, and/or a claim settlement amount.

Some embodiments described herein are associated with a "user device," a "remote device," or a "network device." As used herein, each of a "user device" and a "remote device" is a subset of a "network device." The "network device," for example, may generally refer to any device that can communicate via a network, while the "user device" may comprise a network device that is owned and/or operated by or otherwise associated with a particular user (and/or group of users—e.g., via shared login credentials and/or usage rights). A "remote device" may generally comprise, for example, a device remote from a primary device or system component and/or may comprise a wireless and/or portable network device. Examples of user, remote, and/or network devices may include, but are not limited to: a PC, a computer workstation, a computer server, a printer, a scanner, a facsimile machine, a copier, a personal digital assistant (PDA), a storage device (e.g., a disk drive), a hub, a router, a switch, and a modem, a video game console, or a wireless or cellular telephone. User, remote, message, and/or network devices may, in some embodiments, comprise one or more network components.

As used herein, the term "network component" may refer to a user, remote, or network device, or a component, piece, portion, or combination of user, remote, or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication," as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination In some embodiments, one or more specialized machines, such as a computerized processing device, a server, a remote terminal, and/or a customer device may implement the various practices described herein. A computer system of an insurance claim processing enterprise may, for example, comprise various specialized computers that interact to analyze, process, and/or transform data as described herein The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant reserves the right to file additional applications to pursue patents for subject matter that has been disclosed and enabled but not claimed in the present application.

What is claimed is:
1. A message processing system comprising:
a processing device;
an electronic communications network transceiver device in communication with the processing device; and
a computer-readable memory device in communication with the processing device, the computer-readable memory device storing instructions wherein the instructions, when executed by the processing device, direct the processing device to:
receive, from a remote user device associated with a user, a text message;
identify, based on (i) the text message and (ii) at least one intent rule, a message intent associated with the text message;
generate, based on (i) the text message and (ii) at least one conversation rule, an outgoing message to transmit to the remote user device;
associate the text message and the outgoing message with a conversation identifier that identifies a conversation;

identify a current state of the conversation based on at least one conversation state rule and at least one of the following: (i) the text message, (ii) the message intent, and (iii) the outgoing message;

output, via the electronic communications network transceiver device, the outgoing message to the remote user device; and store an indication of the current state in association with the conversation.

2. The message processing system of claim 1, wherein the instructions, when executed by the processing device, further direct the processing device to perform at least one of the following:

receive data indicative of the at least one intent rule for recognizing a message intent;

receive data indicative of the at least one conversation rule for generating an outgoing message; and receive data indicative of the at least one conversation state rule for identifying a conversation state.

3. The message processing system of claim 2, wherein the instructions, when executed by the processing device, further direct the processing device to:

store, into an intent rules database, the data indicative of the at least one intent rule;

store, into a conversation rules database, the data indicative of the at least one conversation rule; and store, into a conversation state rules database, the data indicative of the at least one conversation state rule.

4. The message processing system of claim 2, wherein the instructions comprise a conversation state analysis module, and wherein receiving data indicative of the at least one conversation state rule is performed by executing the conversation state analysis module.

5. The message processing system of claim 1, wherein the instructions, when executed by the processing device, further direct the processing device to:

identify, based on the current state of the conversation, a processing service to initiate; and transmit, to a second processing device associated with the processing service, a signal to initiate the processing service in association with the user.

6. The message processing system of claim 5, wherein transmitting the signal to initiate the processing service comprises transmitting a request signal to an emergency service.

7. The message processing system of claim 5, wherein transmitting the signal to initiate the processing service comprises transmitting a request signal to a roadside assistance service.

8. The message processing system of claim 1, wherein the text message comprises an electronic message in short messaging service (SMS) format.

9. The message processing system of claim 1, wherein the text message comprises an electronic message in multimedia messaging service (MMS) format.

10. The message processing system of claim 1, wherein the instructions, when executed by the processing device, further direct the processing device to:

identify, using a natural language process, at least one keyword in the text message, the keyword corresponding to an intent rule of the at least one intent rule.

11. The message processing system of claim 1, wherein the text message comprises an indication of an occurrence of a vehicular accident.

12. The message processing system of claim 1, wherein the identified message intent comprises an indication of a request for assistance in response to a vehicular accident.

13. The message processing system of claim 1, wherein the outgoing message comprises a request for the user to provide an image file.

14. The message processing system of claim 1, wherein the outgoing message comprises an indication of a service provider based on a location of the remote user device.

15. The message processing system of claim 1, wherein the instructions comprise a conversation state analysis module, and wherein identifying the current state of the conversation is performed by executing the conversation state analysis module.

16. A method comprising:

receiving, from a remote user device associated with a user, a text message;

identifying, based on (i) the text message and (ii) at least one intent rule, a message intent associated with the text message;

generating, based on (i) the text message and (ii) at least one conversation rule, an outgoing message to transmit to the remote user device;

associating the text message and the outgoing message with a conversation identifier that identifies a conversation;

identifying, by a conversation state analysis module, a current state of the conversation based on at least one conversation state rule and at least one of the following: (i) the text message, (ii) the message intent, and (iii) the outgoing message;

outputting, via the electronic communications network transceiver device, the outgoing message to the remote user device; and storing, by the conversation state analysis module, an indication of the current state in association with the conversation.

17. The method of claim 16, further comprising at least one of the following:

receiving data indicative of the at least one intent rule for recognizing a message intent;

receiving data indicative of the at least one conversation rule for generating an outgoing message; and receiving data indicative of the at least one conversation state rule for identifying a conversation state.

18. The method of claim 16, further comprising:

identifying, based on the current state of the conversation, a processing service to initiate; and transmitting, to a second processing device associated with the processing service, a signal to initiate the processing service in association with the user.

19. The method of claim 18, wherein transmitting the signal to initiate the processing service comprises transmitting a request signal to an emergency service.

20. The method of claim 18, wherein transmitting the signal to initiate the processing service comprises transmitting a request signal to a roadside assistance service.

21. The method of claim 16, wherein the text message comprises an electronic message in at least one of the following: short messaging service (SMS) format, and multimedia message service (MMS) format.

22. The method of claim 16, further comprising:

identifying, using a natural language process, at least one keyword in the text message, the keyword corresponding to an intent rule of the at least one intent rule.

23. The method of claim 16, wherein the text message comprises an indication of an occurrence of a vehicular accident.

24. The method of claim 16, wherein the identified message intent comprises an indication of a request for assistance in response to a vehicular accident.

\* \* \* \* \*